Figure 1:
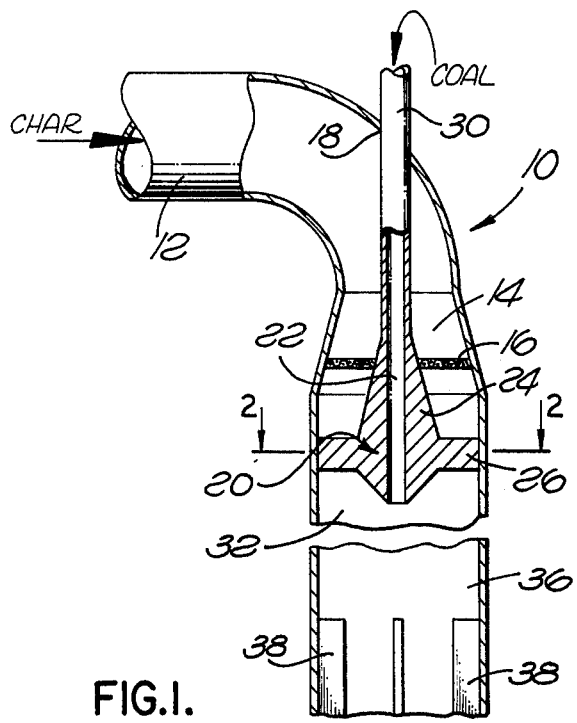

United States Patent [19]

Nuttall, Jr.

[11] 4,108,732
[45] Aug. 22, 1978

[54] HEATING CARBONACEOUS PARTICULATE MATERIAL

[75] Inventor: Herbert E. Nuttall, Jr., Albuquerque, N. Mex.

[73] Assignee: Occidental Petroleum Corporation, Los Angeles, Calif.

[21] Appl. No.: 747,208

[22] Filed: Dec. 3, 1976

Related U.S. Application Data

[63] Continuation-in-part of Ser. No. 473,125, May 24, 1974, abandoned.

[51] Int. Cl.² .................. C10B 1/04; C10B 49/06; C10B 49/12; C10B 49/20
[52] U.S. Cl. ..................... 201/22; 201/13; 201/17; 201/18; 201/21; 201/32; 23/284; 366/165
[58] Field of Search ............ 201/7, 8, 10, 12, 17, 201/21, 22, 28, 31, 32, 33, 36, 38, 26, 40, 13; 48/DIG. 4, 202; 259/4 S, 13 A; 23/284, 271 P, 271 C; 214/18.38; 110/28 B, 28 F

[56] References Cited

U.S. PATENT DOCUMENTS

| | | | |
|---|---|---|---|
| 2,026,923 | 1/1936 | Warner | 201/38 |
| 2,127,542 | 8/1938 | Stitzer | 201/38 |
| 2,368,827 | 2/1945 | Hanson et al. | 110/28 F |
| 2,657,501 | 11/1953 | Mayland | 48/DIG. 4 |
| 2,719,112 | 9/1955 | Kearby et al. | 201/31 X |
| 2,725,347 | 11/1955 | Leffer | 201/31 |
| 2,805,188 | 9/1957 | Josenhans | 201/36 X |
| 2,879,148 | 3/1959 | Atwell | 48/DIG. 4 |
| 2,920,945 | 1/1960 | Totzek | 48/DIG. 4 |
| 2,978,299 | 4/1961 | Milne | 23/271 P |
| 3,779,722 | 12/1973 | Tatum | 201/17 X |

FOREIGN PATENT DOCUMENTS 1,179,462  1/1970  United Kingdom ............ 201/31

Primary Examiner—Morris O. Wolk
Assistant Examiner—Michael S. Marcus
Attorney, Agent, or Firm—Forrest E. Logan

[57] ABSTRACT

A method for mixing a stream of particulate carbonaceous material with another stream of particulate material in a reaction zone maintained substantially free of free oxygen, which method is especially useful for mixing a stream of particulate agglomerative carbonaceous material with a stream of particulate heat-supplying material to produce valuable gaseous, liquid and solid products. This invention discloses a number of apparatuses useful for mixing streams of particulate material in a reactor maintained substantially free of free oxygen.

29 Claims, 6 Drawing Figures

U.S. Patent    Aug. 22, 1978    4,108,732

HEATING CARBONACEOUS PARTICULATE MATERIAL

This Application is a continuation-in-part of co-pending application Ser. No. 473,125 filed May 24, 1974 and now abandoned.

The present invention relates to a process and an apparatus for mixing a particulate carbonaceous material with another particulate material in a reaction zone maintained substantially free of free oxygen. Particularly the present invention relates to a particulate carbonaceous material which is also agglomerative on heating. More particularly, the present invention relates to an apparatus for mixing such materials which are dispersed throughout a medium. Still more particularly, the invention relates to the mixing of streams containing such materials dispersed throughout media. Even more particularly, the invention relates to the controlled separation of such streams, whereby certain physical and-/or chemical reaction occurs before bringing them together.

A fluid stream may be injected axially into the center of a swirling annular fluid stream or vortex without unduly mixing the two streams, provided the annular stream has sufficient swirl and the axially injected stream has sufficient velocity. Such a vortex will begin to decay, however, because of transfer of sufficient momentum from a swirling mode to an axial mode. The interaction of the two streams during such a decay is accompanied by large scale turbulence or vortex break and the mixing thereof.

Swirling or vortex flows have found application in the development of solid particle separators, heat transfer surfaces, gas separators, combustion devices, and have been used in a variety of such separators, heat exchangers and/or devices. Such uses have been directed to mixing or separating solid particles with or from fluid media, and have not been concerned with a controlled separation of separate streams for a limited time or a limited distance along the direction of swirling flow prior to the mixing thereof.

Swirling gas reactors have been proposed by the U.S. Bureau of Mines which inject or pump a mixture or suspension of coal and steam through the center thereof, the swirling gas being air with pulverized coal dispersed therein which ignites due to a hot reactor wall and burns, which increases the degree of swirl as a result. Radiant heat is also emitted as a result of the burning which gasifies the injected coal at the center. Such reactors each have a large void fraction for giving caking coals sufficient time to pass through a sticky phase before migrating to the reactor wall.

The burned coal in the prior device has nothing to act as a shield between it and the reactor wall nor is the prior device self-cleaning if some of the coal sticks to the wall during use.

The large void fraction limits the coal throughout of the prior device and lowers efficiency in the operation thereof; the fraction also limits the useful range of operation of the device. The fraction also does not necessarily completely prevent sticky particles from attaching to the reactor wall, subjecting the reactor to the risk of becoming plugged if rigid operating conditions are not adhered to.

By a particulate agglomerative carbonaceous material, as used herein, is meant a carbonaceous material, such as a caking coal, which undergoes a sticky or tacky state when subjected to temperatures ranging from about 400° Fahrenheit and upwards. Normally a material in the sticky state cannot be used in apparatus without fear that the material will attach to the apparatus and plug it. The sticky or tacky state is only temporary, however, and disappears with the passage of sufficient time at temperatures in excess of 400° Fahrenheit, permitting the material to be processed or conveyed normally thereafter without concern for plugging.

Current methods of pyrolyzing an agglomerative carbonaceous material either lower the tar and gas yields obtainable therefrom by pre-treatment, as with oxygen, or else are not suitable for rapid pyrolysis.

Literature relating to the present invention may be found at:

1. Benjamin, T. Brooke, Theory of Vortex Breakdown Phenomenon, Journal of Fluid Mechanics, Vol. 14, 1962.
2. Harvey, J. K., Some Observations of Vortex Breakdown Phenomenon, Journal of Fluid Mechanics, Vol. 14, 1962.
3. Friction and Forced Convection Heat-Transfer Characteristics in Tubes with Twisted Tape Generators, Journal of Heat Transfer, February, 1964.
4. Hacker, D. S., Swirl Flow Reactors, University of Illinois at Chicago Circle, A.I. Ch. E. Free Forum Wednesday, Dec. 1, 1971.
5. Murthy, S. N. B., Survey of Some Aspects of Swirling Flows, Aerospace Research Laboratories 71-0244, November, 1971.
6. Nissan, A. H. and Bresan, Swirling Flow in Cylinders, A. I. Ch. E. Journal, Vol. 7, No. 4, December, 1961.
7 Coal-To-Gas Conversion . . . Search for New Ideas Intensifies, Coal Age, February, 1973.

It is therefore an object of the present invention to provide a new and novel apparatus and method for mixing a particulate carbonaceous material with another particulate material in a reaction zone maintained substantially free of free oxygen.

Another object of the present invention is to provide apparatus and method of the aforementioned type which provides for the controlled separation of the particulate materials before the mixing thereof.

Still another object of the present invention is to provide such apparatus and method which provides for the controlled separation of streams containing particulate materials before the mixing thereof.

An additional object of the present invention is to provide such apparatus and method which provides a more efficient heat source for heating the particulate materials.

Yet an additional object is to provide such apparatus and method which provides a shield between the particulate materials being treated and the apparatus itself.

A further object is to provide such apparatus and method which is self-cleaning in the event that some particulate materials stick thereto in the operation thereof.

Still a further object is to provide such apparatus and method which is more efficient in operation than prior devices.

Yet a further object is to provide such apparatus and method which is operable over a wider range of conditions without fear of plugging.

An even further object of the present invention is to provide apparatus and method for a more rapid pyrolysis of particulate carbonaceous materials, especially agglomerative particulate carbonaceous materials, than that provided by prior devices.

Yet an even further object of the present invention is to provide such apparatus and method which provides for pyrolysis of particulate materials to produce valuable gaseous, liquid and solid products without lowering the yields obtainable therefrom.

Still a further object is to provide a process and apparatus for pyrolyzing agglomerative particulate materials, especially agglomerative coals, in a reaction zone determined by confining boundaries to produce valuable gaseous, liquid and solid products without said products adhering to the confining boundaries thereof to such an extent as to cause plugging thereof.

Figure 4:
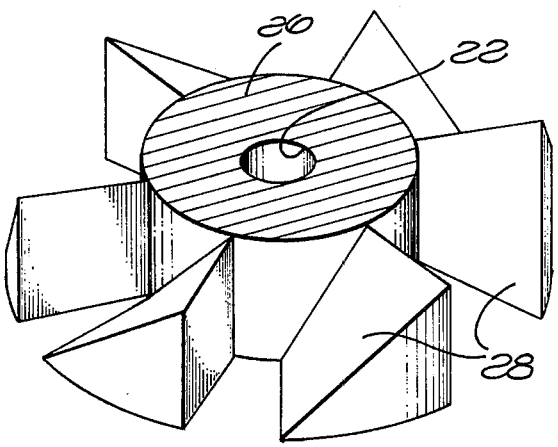
Figure 2:
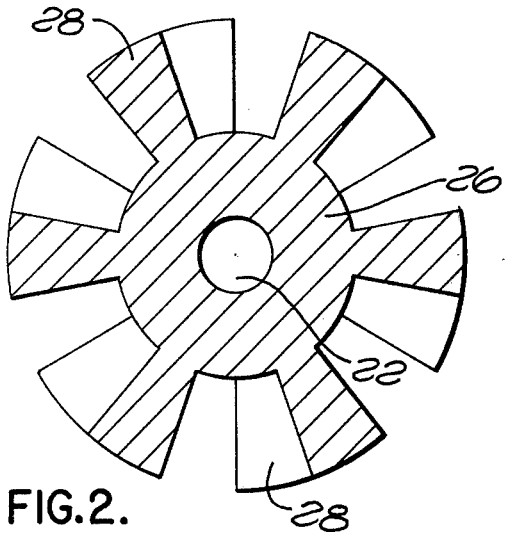
Figure 3:
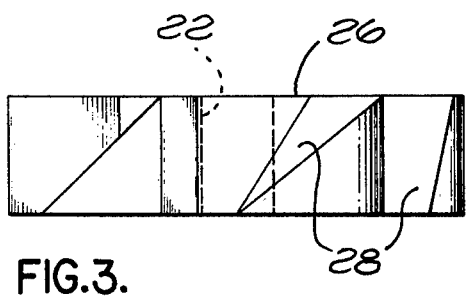
Figure 5:
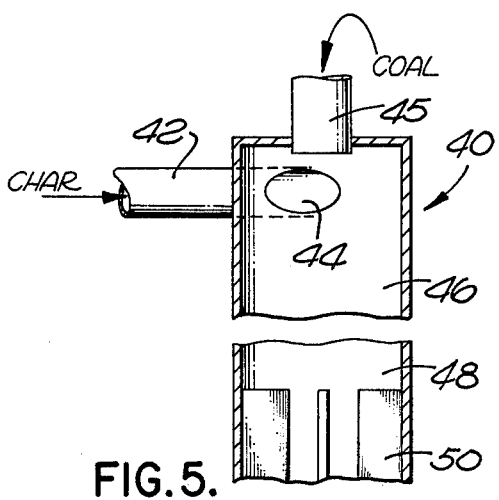
Figure 6:
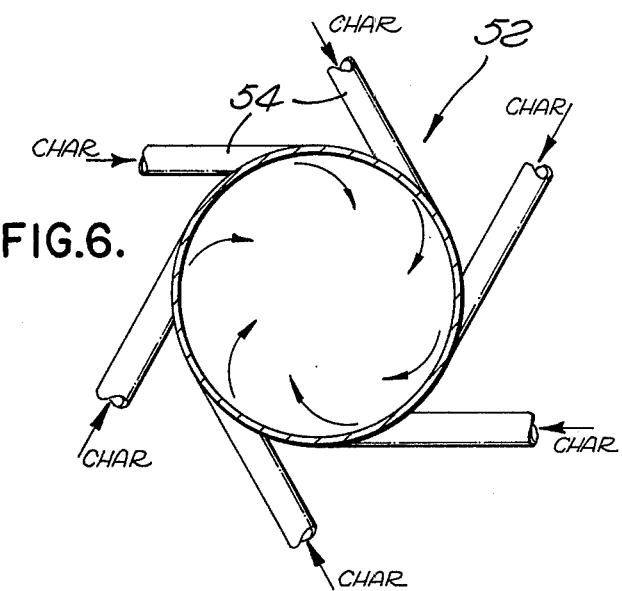

Other objects and advantages of the present invention will become apparent from a detailed consideration of the following part of the specification taken in conjunction with the appended drawing in which like parts have like numerals throughout the several views, and in which:

FIG. 1 is an elevational view, largely in section, of an embodiment of the present inventive apparatus; and FIG. 2 is a sectional view of apparatus shown in FIG. 1 taken along line 2–2 thereof; and FIG. 3 is an elevational view of apparatus shown in FIG. 2; and FIG. 4 is a perspective view of the apparatus of FIG. 3; and FIG. 5 is an elevational view, mostly in section, of another embodiment of the present inventive apparatus; and FIG. 6 is a plan view, partly in section, of yet another embodiment of the present inventive apparatus, the arrows indicating the direction of fluid flow.

The present inventive apparatus generally includes a reactor having a first inlet for admitting a primary stream comprising a primary particulate material and also having swirling means for imparting such motion to the primary stream and forming a swirling annulus thereby. The reactor further has a second inlet for admitting a secondary stream comprising a particulate carbonaceous material and directed into the central cavity formed by the swirling annulus. The reactor still further has a reaction zone where the particulate carbonaceous material is subjected to the influence of the primary particulate material and an after section for mixing the streams, preferably provided with swirl stopping means to stop the swirling of the primary stream.

The first inlet is a conduit, preferably cylindrical, near the point of entry into the reactor and is provided with means, preferably a screen or grid, to distribute particles uniformly around the conduit and throughout the cross-section thereof.

A swirling means imparts a swirling motion to the primary stream by virtue of its shaped, such as vanes, and its position in the apparatus. More preferably, the swirling means comprises at least one and even more preferably a plurality of vanes, the pitch of which may be varied to control the degree of swirl imparted to the stream.

The second inlet is a conduit, preferably cylindrical and directed to the central cavity formed by the swirling annulus, more preferably the second inlet is in axial alignment with the swirling annulus.

The reaction zone is cylindrical and communicates with the first inlet and also with the second inlet for admitting the primary and secondary streams. In the reaction zone the carbonaceous particulate material is subjected to the influence of the primary particulate material.

The after section is preferably cylindrical and communicates with the reaction zone for receiving the two streams after the desired controlled separation and/or chemical and/or physical reaction has taken place. Mixing of the two streams will occur, it is believed by vortex decay or break, if the section is sufficiently long. However, swirl stopping means are preferably provided to stop the swirling of the primary stream and accomplish mixing sooner. Preferably the swirl stopping means is at least one and preferably a plurality of baffles.

In another embodiment of the reactor, the first inlet is connected tangentially to the cylindrical reaction zone and thereby also forms a swirling means by virture of its tangential communication to the cylindrical reaction zone. In still another embodiment of the reactor, a multiplicity of such first inlets is provided for better swirling effects and more uniform distribution.

The present inventive method is directed to an improvement in swirling flow reactors each having a primary fluid stream forming a swirling annulus and a secondary fluid stream injected into the central cavity of the annulus, and axially therewith, with subsequent mixing of the two streams upon decay of the swirl of the swirling annulus or primary stream.

The method is useful generally in swirling flow reactors which have a primary stream containing a primary particulate material which forms a swirling annulus and a secondary stream which contains a particulate carbonaceous material injected into the central cavity of the swirling annulus with subsequent mixing of the two streams upon the decay of the swirl. The improvement in method which comprises maintaining the streams substantially free of free oxygen and subjecting the secondary stream to the influence of the primary stream for a period of time sufficient to cause a transformation of the particulate carbonaceous material into a substance of chemical composition different than its initial chemical composition.

In one embodiment the particulate material of the primary stream is relatively hot or heat-supplying and the particulate carbonaceous material of the secondary stream is subjected to the influence of the heat-supplying particulate material whereby a desired change occurs either physical and/or chemical in the particulate carbonaceous material of the secondary stream.

The primary stream preferably comprises a gas which does not enter into a deleterious reaction with the particulate materials and the products produced by the process. The gas must be substantially free of free oxygen. By substantially free of free oxygen as used and claimed herein is meant that the amount of free oxygen per unit volume of particulate material admitted into the pyrolysis zone through any or all feed streams entering the pyrolysis zone is no greater than the void volume of the bulk particulate materials in such unit volumes. For example, the amount of free oxygen will be no greater than that which is normally included with the particulate material as it is fed from a hopper in a feed system into the pyrolysis zone in the reactor without purging the hopper to remove oxygen (or air) from the void spaces between the particles. One skilled in the art will appreciate that the amount of oxygen or air on a weight basis included in the void spaces as described is very small and such a small amount of oxygen will not result in a significant amount of oxidation of the product.

In one embodiment the particulate material is purged with a purge gas to substantially remove the oxygen that may be present in the void space before the particulate mateial is fed to the pyrolysis zone.

In some applications, the primary particulate material is preheated and then conveyed in a gas stream to form the primary stream. The primary particular materials are preferably good heat absorbers and transferers. The primary particulate material can be heated in a separate reactor either by heat exchange methods as in a heat exchanger or in a fluidized bed or transport reactor (also known as an entrained bed reactor). If the primary particulate material is carbonaceous then a fluidized bed reactor or transport reactor is particularly useful because the primary particulate material may be heated by combustion of a portion thereof in such a reactor.

The preferred primary gases are steam and/or nitrogen or mixtures thereof and the preferred primary particulate material is char from the pyrolysis of coal.

The secondary stream preferably comprises a gas. The gas should be non-deleteriously reactive with the particulate materials and the products produced by the process. The gas is preferably inert and must be substantially free of free oxygen. In some embodiments preferably the gas is steam. In many applications the particulate carbonaceous material is heated by primary particulate material which causes the particulate carbonaceous material to heat up and devolatilize thereby producing valuable gaseous, liquid and solid products.

The present process is useful for reacting two streams in a reaction zone determined by a confining boundary, by forming a primary stream comprising a first particulate material in swirling flow so as to produce a swirling annulus having a central cavity. A secondary stream comprising a second particulate material, which is cabonaceous, is introduced into the central cavity of the swirling annulus. Both streams are maintained substantially free of free oxygen.

The swirling annulus provides a protective shield around the reaction zone for a distance along the direction of swirling flow, the distance being sufficient to permit the second particulate material to undergo a reaction or transformation caused by the influence of said first particulate material. The reaction transforms the second particulate material into a substance of different chemical composition than its initial chemical composition. The secondary stream is then mixed with the primary stream after the desired reaction has been substantially completed. The streams may then undergo another reaction.

The present process is especially useful for pyrolyzing particulate agglomerative carbonaceous material by having the primary stream contain a heat-supplying particulate material and the secondary stream contain the particulate agglomerative carbonaceous material. The swirling annulus provides a protective shield around the reaction zone for a distance along the direction of swirling flow sufficient to permit the particulate agglomerative carbonaceous material to pyrolyze by the transfer of heat the heat-supplying material. The particulate agglomerative carbonaceous material is thusly transformed into a solid residue which will not adhere to the confining boundary of the reaction zone. In this respect the process is especially useful for the pyrolysis of agglomerative coals.

The present process is also especially useful for an embodiment in which the primary stream comprises a gas in which the heat-supplying particulate material is entrained and the secondary stream comprises a gas in which the particulate agglomerative carbonaceous material is entrained.

The present process is still more useful and efficient when the heat-supplying particulate material is a product of the process, for example a char produced by the pyrolysis of the particulate carbonaceous material, for example coal char produced by the pyrolysis of coal.

Turning now to the drawings, in FIG. 1 a first reactor is generally designated 10 and has a conduit first inlet 12 having an upright, as shown, portion 14, which has a screen 16. The inlet is further adapted at 18 for the introduction of a second inlet.

Reactor 10 also has an annular swirling means generally designated 20 and positioned in the path of incoming primary stream from the first inlet 12 and having cylindrical hollow core 22 extending therethrough. Means 20 has an annular upright portion 24 adapted to force incoming primary stream to the sides of the reactor after passing through screen 16. Means 20 further has a lower annular portion 26 adapted to impart swirl to incoming fluid by virtue of having a plurality of vanes 28.

Reactor 10 further has a second annular upright inlet 30, in this embodiment, extending through the first inlet 12 and connected to swirling means 20 amd also communicating with hollow core 22 thereof.

Reactor 10 still further has a reaction zone 32 determined by cylindrical boundary communicating with both the first and second inlets and also has after section 36 having a plurality of baffles 38.

A second reactor, as shown in FIG. 5, is generally designated 40 and includes a first conduit inlet 42 which is tangentially connected at 44 to a cylindrical portion of the reactor which forms a swirling means for incoming fluid. Reactor 40 also has a second conduit inlet 45, a cylindrical reacting section 46 communicating with both the first and second inlets, and a cylindrical after section 48 having a plurality of baffles 50.

A third reactor, as shown in FIG. 6, is generally designated 52 and has a multiplicity of first conduit inlets 54 tangentially connected to a cylindrical portion thereof, whereby incoming fluids are swirled.

The size of the particulate materials used in the present invention may range widely as long as they can remain entrained in their respective streams. Preferably, the size may range from that of dust to that of sand. More preferably, 70% 200 mesh or 74 microns is used.

The temperature of a primary stream used in heat treating may range widely as long as it has the desired effect upon the secondary stream, but preferably ranges from about 800° to about 1900° Fahrenheit. The temperature of such a secondary stream may vary widely, but is normally much lower than that of the primary stream. After mixing of the two streams the temperature of the mixed stream may also vary widely.

The following example illustrates an embodiment of this invention.

Finely ground char of about 200 mesh size, 74 microns in diameter, in a fluid medium or carrier gas of inert nitrogen, is introduced into a reactor as shown in FIG. 1 as a primary stream. The following conditions are preset:

Char mass flow rate: 2600 pounds per hour
Carrier gas flow rate: 40 SCFM*
Gas mass flow rate: 177 pounds per hour
Ratio of char to gass: 14.7/1
Temperature: 1200° Fahrenheit Pressure: 16 pounds per square inch absolute
Void fraction: 0.995
Velocity: 33.9 feet per second
Reynolds number: 7730
First Inlet, diameter: 3.26 inches
Area for flow: 0.05796 square feet

*SCFM — Standard cubic feet per minute at 60° Fahrenheit and 1 atmosphere of pressure.

Finely divided coal of about 200 mesh size, 74 microns in diameter, in a fluid medium or carrier gas of inert steam is introduced into a reactor as shown in FIG. 1 as a secondary stream. The following operating conditions prevail:

Coal mass flow rate: 125 pounds per hour
Carrier gas flow rate: 14 SCFM*
Gas mass flow rate: 62 pounds per hour
Ratio of coal to gas: 2/1
Temperature: 70° Fahrenheit
Pressure: 16 pounds per square inch absolute
Void fraction: 0.998
Velocity; 36.4 feet per second
Reynolds number: 19,000
Second Inlet, diameter: 1.049 inches
Area for flow: 0.006 square feet The mixed stream resulting from mixing the primary and secondary streams has the following estimated characteristics:

Coal devolatilization: 40%
Molecular weight of vapors: 28
Total char mass flow rate: 2675 pounds per hour
Total gas flow rate: 65.3 SCFM*
Gas mass flow rate: 289 pounds per hour
Char to gas ratio: 9.25/1
Temperature: 1075° Fahrenheit
After section diameter: 4.26 inches
Area of flow: 0.09898 square feet
Void fraction: 0.997
Velocity: 29.9 feet per second
Reynolds number: 9500

It is to be understood that the above example is illustrative of this invention and that apparatus size can be varied and processing parameters varied as required to best serve the particular objective desired.

In operation of the present apparatus and method a hot primary, preferably heated char, stream comes into the reactor and into a reaction zone through the first inlet where it is swirled by the swirling means and forms a swirling annulus against the confining boundary or the wall of the reactor. A secondary, preferably coal stream come into the reactor through the second inlet axially at the center of the swirling annulus.

The coal is heated by heat from the annulus of heated char and becomes sticky. The swirling annulus of char prevents such coal from contacting and adhering to the reactor wall. While we do not wish to be bound by theory, it is believed that the hot char heats the gas medium of the coal stream which in turn heats the coal. It is preferred that the coal stream be turbulent to better that the coal.

Both streams pass into an after section at which point the coal has lost its stickiness and the streams mix by encountering of series of baffles. The mixed stream is led to apparatus for separating the products.

It will be apparent from a consideration of the foregoing part of the specification that the present invention has accomplished all the objects and advantages previously set forth for it.

It is to be understood that only the preferred embodiments of the present invention have been set forth and described in detail in the foregoing part of the specification and that the invention may be practiced otherwise than as a specifically described and within the scope of the appended claims.

What is claimed is:

1. A process for subjecting carbonaceous particulate material to the influence of a stream comprising a heat-supplying particulate material comprising:
   a. forming a primary swirling annular stream, substantially free of free oxygen by preventing free oxygen from being mixed with said stream during the formation of said stream, said stream comprising an entrained heat-supplying primary particulate material, said primary swirling annular stream having a central cavity;
   b. introducing into said central cavity of secondary stream comprising a fresh carbonaceous particulate material, substantially free of free oxygen by preventing free oxygen from being mixed with said stream prior to and during introduction into said central cavity, said fresh carbonaceous particulate material having an initial chemical composition;
   c. subjecting said fresh carbonaceous particulate material to the influence of said heat-supplying primary particulate material thereby causing a transformation of said fresh carbonaceous particulate material into a substance of different chemical composition than said initial chemical composition, said substance comprising a solid product, and preventing free oxygen from being introduced into said reactor; and
   d. removing all material from said reactor.

2. The process of claim 1 further comprising substantially stopping the swirling motion after said transformation has been substantially completed.

3. The process of claim 1 wherein said fresh carbonaceous particulate material is coal.

4. The process of claim 3 wherein said heat-supplying primary particulate material heats said fresh carbonaceous particulate material to pyrolyze same and to produce gaseous and solid products.

5. A process for pyrolyzing agglomerative carbonaceous material comprising:
   a. forming a primary swirling annular stream comprising a heat-supplying particulate material, substantially free of free oxygen by preventing free oxygen from being mixed with said stream during the formation of said stream, in a reaction zone determined by a confining boundary, said primary swirling annular stream having a central cavity;
   b. introducing into said central cavity a secondary stream comprising a particulate agglomerative carbonaceous material, substantially free of free oxygen by preventing free oxygen from being mixed with said stream prior to and during introduction into said central cavity;
   c. heating said particulate agglomerative carbonaceous material by the transfer of heat from said heat-supplying particulate material, thereby causing a transformation of said particulate agglomerative carbonaceous material into a form which will not adhere to said confining boundary, and thereby preventing particulate agglomerative material from adhering to said confining boundary, said form comprising a solid product, and preventing free oxygen from being introduced into said reaction zone; and d. removing all material from said reaction zone of said reactor.

6. The process of claim 5 further comprising substantially stopping the swirling motion after said transformation has been substantially completed.

7. The process of claim 5 wherein said agglomerative carbonaceous material is agglomerative coal.

8. The process of claim 7 wherein said secondary stream comprises a gas in which said particulate agglomerative coal is entrained.

9. The process of claim 8 wherein said secondary stream comprises a gas which does not enter into a deleterious reaction with said secondary stream and the products of the process.

10. The process of claim 7 wherein said primary stream comprises a gas in which said heat-supplying particulate material is entrained.

11. The process of claim 10 wherein said primary stream comprises a gas which does not enter into a deleterious reaction with said secondary stream and the products of the process.

12. The process of claim 7 wherein said secondary stream comprises a first gas in which said particulate agglomerative coal is entrained, said primary stream comprises a second gas in which said heat-supplying particulate material is entrained, said heat-supplying particulate material is a product of the process which is recycled to the reaction zone, and said first gas and said second gas being such that they do not enter into a deleterious reaction with said streams and the products of the process.

13. The process of claim 12 wherein said secondary stream is turbulent as it is introduced into said central cavity.

14. The process of claim 12 wherein said particulate agglomerative material is purged with a purge gas to substantially remove oxygen from the void space of said particulate agglomerative material before said particulate agglomerative material is formed into said secondary stream.

15. A process for heating a carbonaceous particulate material comprising:
   a. forming a primary swirling annular stream comprising an entrained heat-supplying primary particulate material, in the absence of free oxygen, said primary swirling annular stream having a central cavity, in a reactor means comprising
      i. a conduit reactor having a circular cross-section,
      ii. a first inlet means communicating with said reactor means for admitting said entrained heat-supplying primary particulate stream into said reactor means,
      iii. a vane means positioned in said reactor means and spaced apart from the axis of said reactor means and downstream of said first inlet means for imparting a swirling annular motion to said entrained heat-supplying primary particulate stream,
      iv. a second inlet means communicating with said reactor means positioned for admitting a secondary particulate stream axially into said reactor means,
      v. a reacting zone within said reactor means and downstream of said second inlet means through which said streams pass, and
      vi. an outlet means in said reactor means and downstream of said reacting zone for removing material from said reactor means;
   b. introducing a secondary stream comprising a fresh carbonaceous particulate material, in the absence of free oxygen, into said second inlet means and into said central cavity;
   c. subjecting said fresh carbonaceous particulate material to the influence of said heat-supplying primary particulate material in said reacting zone to cause a transformation of said fresh carbonaceous particulate material into a substance a different chemical composition, said substance comprising a solid product and preventing free oxygen from being introduced into said reactor means; and
   d. removing all materials from said reactor means through said outlet means.

16. The process of claim 15 wherein said vane means comprises a plurality of vanes.

17. The process of claim 15 wherein said vane means comprises a plurality of vanes which are positioned in an annular configuration.

18. The process of claim 15 wherein said second inlet means terminates downstream of said vane means.

19. The process of claim 15 further comprising a distributing means within said first inlet means for distributing particulate materials substantially uniformly in the primary stream.

20. The process of claim 19 wherein said distributing means comprises a screen.

21. The process of claim 15 further comprising an antiswirl-after-section means communicating with said reactor means and downstream of said reacting zone for stopping swirling motion.

22. The process of claim 21 wherein said antiswirl-after-section means comprises a baffle means.

23. The process of claim 21 wherein said antiswirl-after-section means comprises a plurality of baffles.

24. A process for heating a carbonaceous particulate material comprising:
   a. forming a primary swirling annular stream comprising an entrained heat-supplying primary particulate material in the absence of free oxygen, said primary swirling annular stream having a central cavity, in a reactor means comprising
      i. a conduit reactor having a circular cross-section,
      ii. a first inlet means communicating with said reactor means for admitting said entrained heat-supplying primary particulate stream into said reactor means,
      iii. a swirling means positioned in said reactor means for imparting a swirling annular motion to said entrained heat-supplying primary particulate stream,
      iv. a second inlet means communicating with said reactor means positioned for admitting a secondary particulate stream axially into said reactor means,
      v. a reacting zone within said reactor means and downstream of said second inlet means through which said streams pass,
      vi. an antiswirl-after-section means positioned in said reactor means and downstream of said reacting zone for stopping swirling motion, and
      vii. an outlet means in said reactor means and downstream of said reacting zone for removing material from said reactor means;
   b. introducing a secondary stream comprising a fresh carbonaceous particulate material, in the absence of free oxygen, into said second inlet means and into said central cavity;

c. subjecting said fresh carbonaceous particulate material to the influence of said heat-supplying primary particulate material in said reacting zone to cause a transformation of said fresh carbonaceous particulate material into a substance of different chemical composition, said substance comprising a solid product and preventing free oxygen from being introduced into said reactor means; and d. removing all materials from said reactor means through said outlet means.

25. The process of claim 24 wherein said first inlet means is in tangential communication with said reactor means.

26. The process of claim 24 wherein said first inlet means comprises a plurality of inlets.

27. The process of claim 24 wherein said antiswirl-after-section means comprises a baffle means.

28. The process of claim 24 wherein said antiswirl-after-section means comprises a plurality of baffles.

29. The process of claim 25 wherein said first inlet means comprises a plurality of inlets and said antiswirl-after-section comprises a plurality of baffles.

* * * * *